May 17, 1955
J. A. VIOLA
2,708,701
DIRECT CURRENT SHUNT
Filed May 12, 1953
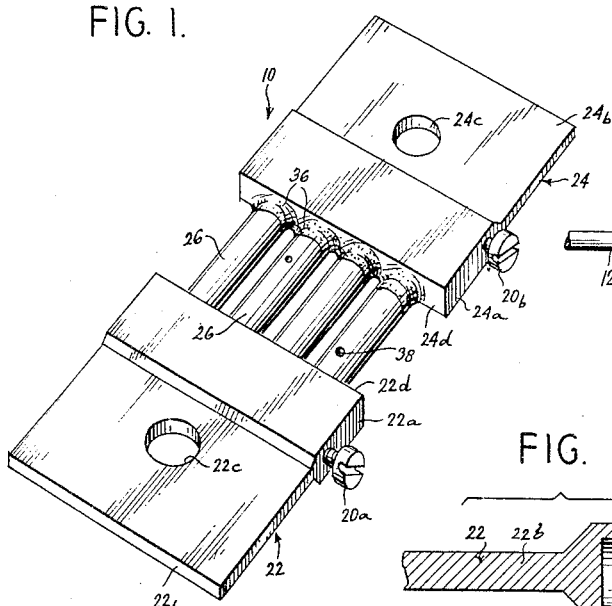
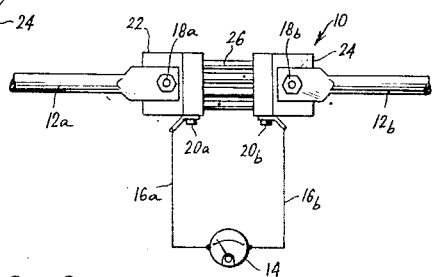
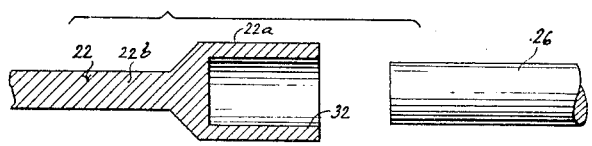
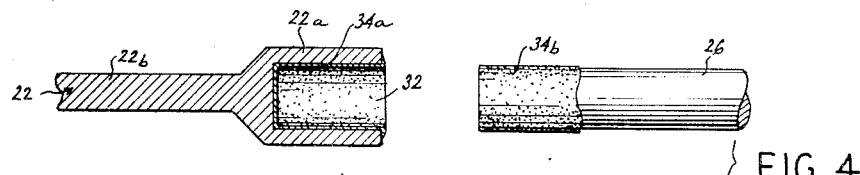
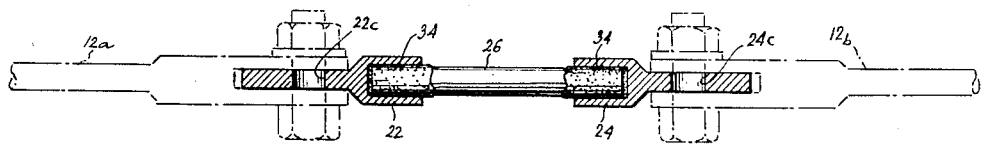
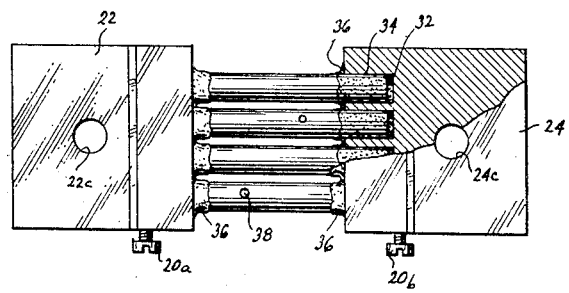
INVENTOR
JAMES A. VIOLA
BY *Morton Amster*
ATTORNEY United States Patent Office 2,708,701
Patented May 17, 1955

2,708,701

DIRECT CURRENT SHUNT

James A. Viola, New York, N. Y.

Application May 12, 1953, Serial No. 354,526

2 Claims. (Cl. 201—63)

The present invention relates to the manufacture of electrical resistance elements, and in particular to a method of fabricating high quality direct current shunts, and to such shunts as products.

In the measuring of relatively high currents, ranging from 150 to 10,000 amperes, it is commonplace to employ a series direct current shunt connected in parallel with an appropriate ammeter by calibrated leads. Customarily, the shunts embody resistance elements of a low temperature coefficient metal alloy, such as manganin, to minimize resistance variations incident to changes in ambient temperature. Although still other precautions have been taken in the fabrication of shunt resistance elements for high current applications, difficulties have been encountered in initially obtaining the required degree of accuracy in calibration. The problem becomes still more pronounced when attempting to reconcile the requirement for close electrical tolerances with the need for mass production at relatively low unit cost.

Accordingly, it is an object of the present invention to provide an improved method of fabricating resistance elements, especially advantageous as direct current meter shunts for high precision measuring applications. Specifically, it is within the contemplation of the present invention to provide a novel shunt construction facilitating manufacture at low unit cost and ease of precise calibration.

A further problem to be considered is the ability of the shunt to radiate heating losses brought about by the relatively high currents passing therethrough. In this connection, resort has been made to a shunt construction including terminal members interconnected by plural planar resistance elements having surface areas sufficient to provide fairly rapid heat dissipation. Manifest among the problems encountered when utilizing this type of construction is the difficulty of initially joining the planar resistance elements to the terminal members, and thereafter protecting against the tendency of the elements to separate from the terminal members, especially when impacted or subjected to high parting forces. Even the slightest loosening of the joint between the respective resistance-determining elements and the terminal heads causes erratic resistance variations which are prohibitive for reliable measurement.

Therefore, it is a further object of the present invention to provide a novel direct current shunt obviating at least the mentioned difficulties. Specifically, it is within the contemplation of the present invention to provide a shunt construction capable of rapid heat dissipation and relatively impervious to shocking, impacting, and heretofore prohibitive parting forces.

Many other objects and advantages will occur to those skilled in the art as the description proceeds. In order to render the understanding of the invention more complete and lucid, and further to comply with the statutes relating to the same in pointing out precisely where I have made a patentable advance in the arts and sciences, I have shown and described a specific embodiment of the invention, as well as a preferred method of fabrication. Reference should be made to the detailed description to follow in conjunction with the accompanying drawings, wherein:

Fig. 1 is a perspective view of a direct current shunt embodying features of the present invention;

Fig. 2 is a plan view on a reduced scale showing the direct current shunt of Fig. 1 connected in series with a relatively high current source and paralleling a direct current ammeter;

Fig. 3 is an exploded view, on an enlarged scale and with parts sectioned, showing a first step in the fabrication of direct current shunts by a preferred process;

Fig. 4 is an exploded view similar to Fig. 3 showing a further step of the process;

Fig. 5 is an elevational view with parts sectioned and shown in phantom, illustrating a still further step of the process; and Fig. 6 is a plan view with parts broken away and sectioned, showing the final steps of the process.

Referring now specifically to the drawings, there is shown in Figs. 1 and 2 a direct current shunt 10, embodying features of the present invention, which is to be connected in series with bus bars 12a, 12b and in parallel with a direct current ammeter 14 by calibrated leads 16a, 16b. The shunt 10 is connected in series with the bus bars 12a, 12b carrying the high current to be measured by appropriate nuts and bolts 18a, 18b, the parallel connection via the leads 16a, 16b being effected by means of terminal posts 20a, 20b tapped into the shunt 10.

As seen best in Figs. 1, 4 and 6, the shunt 10 embodies a pair of similar terminal members 22, 24 which include head sections 22a, 24a and connector sections 22b, 24b. The terminal posts 20a, 20b are threaded into the sides of the head sections 22a, 24a and are each provided with an appropriate transverse slot for tightening down to effect perfect electrical connection between the calibrated leads 16a, 16b and the respective terminal members. Circular bores 22c, 24c are provided in the terminal members 22, 24 for the extension therethrough of the studs or bolts of the nut-bolt connectors 18a, 18b straddling the respective bus bars 12a, 12b which are seen in Fig. 5 to have bifurcated ends. For especially large current applications, it may be desirable to also bifurcate the connector sections 22b, 24b of the respective terminal members 22, 24 to provide large area ohmic contacts to the respective bus bars.

Extending between the confronting faces 22d, 24d of the terminal members 22, 24 are a plurality of resistance-determining elements 26 fabricated of an extremely low temperature coefficient metal or alloy, such as manganin. Each element 26 includes end sections received within complementary bores provided in the confronting faces 22d, 24d of the heads or terminal members 22, 24. As seen in Fig. 3, the bores, all designated generally by the reference numeral 30, are circular in cross-section and extend from their entry ends a substantial distance into the respective head sections of the terminal members 22, 24 and receive substantial portions of the resistance-determining elements 26 having a substantially complementary cross-section.

The resistance-determining elements 26 are united to the respective terminal members 22, 24 by continuous conductive coatings of solder 34, substantially coextensive with the peripheral walls of the respective bores 32 and the received end-sections of the resistance-determining elements 26. The method of forming the continuous electrical and mechanical solder bond 34 between the respective heads 22, 24 and the resistance-determining elements will subsequently be described in conjunction with the description of a preferred process in accordance with the invention.

In addition to the metallic bond 34, a further electrical and mechanical joint 36 is provided along the bored faces 22d, 24d of the terminal members 22, 24 surrounding the entry locations of the respective resistance-determining elements 26 into the complementary bores.

The described shunt construction, with perfect internal electrical and mechanical connections between the resistance-determining elements 26 and the terminal members 22, 24 along with the adequate arrangements for stable connection in series with the line to be measured and paralleling the meter 14, assures high electrical stability, good structural strength and other apparent advantages when appropriately calibrated and connected in circuit.

For a more thorough understanding of the invention, a detailed description of the preferred method of fabricating shunts of the present invention will now be described. Specifically, the terminal members 22, 24 are provided with the aligned sets of bores 32 for accommodating end sections of the respective resistance-determining elements 26, as seen in Fig. 3. Thereupon, the peripheral surface of the bore 32 is provided with a continuous coating of solder, designated by the numeral 34a, which is of substantially the same thickness throughout its length. The coextensive end-adjacent section of the resistance-determining element 26 is likewise provided with a continuous and uniform coating 34b of an appropriate lead-tin solder. In order to apply a solder coating of a desired thickness to the bore walls, the respective terminal members 22, 24 are temporarily supported in an upright position with the entry end of the bores uppermost. Thereupon, molten solder is caused to flow downwardly along the periphery of the bore 32 and after a predetermined interval the heads are inverted to avoid solder accumulations within the bore along the bottom wall thereof. The solder coating 34b is applied to the resistance-determining elements 26 by dipping into a molten mass of solder and allowing the same to run off to arrive at a continuous coating. At this point, it is to be expressly noted, as seen in Fig. 4, that the coated internal diameter of the bore 32 and the outer diameter of the coated end-section of the resistance-determining elements 26 are selected to provide a force fit therebetween when the resistance-determining elements 26 and the heads 22, 24 are axially assembled.

Assembly is accomplished by temporarily supporting the terminal members 22, 24 with the respective bores 34 on the confronting faces aligned in pairs or sets. This may be accomplished by supporting the terminal members in movable holders of a hydraulic press. After initially disposing the resistance-determining elements 26 in axial alignment with the accommodating bores, application of endwise pressure to the terminal members by the press will urge the members toward each other to force fit the coated end sections of the respective resistance-determining elements 26 into the bores. By proper initial selection of the bore depth and by avoiding solder accumulations along the base or bottom thereof, the end sections of the elements or rods 26 may be driven home to the assembled position of Fig. 5 wherein the spacing between the confronting faces of the head sections 22a, 24a substantially determines the effective resistance-determining length of the elements or rods 26.

Thereupon, the continuous mechanical and electrical bond between the end sections of the elements 26 and the terminal members 22, 24 is effected by flowing the separate coatings 34a, 34b together to provide a homogeneous conductive layer between the assembled elements. This is accomplished by placing the entire assembly in an oven or the like and elevating the same above the melting temperature of the lead-tin solder of the coating 34. Since the rods 26 are of manganin, and the terminal members 22, 24 are preferably of copper, the assembly is capable of withstanding the melting temperature of the solder, and no problem is encountered in effecting an excellent, stable union between the rods 26 and the terminal members 22, 24.

As is well understood by those skilled in the art, the resistance of a uniformly cylindrical conductor of diameter D and length L may be varied by changing these parameters. The resistance increases directly with increases in length and decreases as an inverse function of the square of the diameter. Calibration is achieved in accordance with the present invention by varying these parameters, namely the effective length of the resistance-determining elements 26 (as predetermined by the separation between the confronting faces of the head sections), and the cross-section of the respective elements. Both the requirements of a predetermined shunt resistance over a range of rated currents, and the ability to rapidly dissipate the internal heat losses, are compatible since it is possible to make the peripheral surfaces of the resistance-determining elements 26 as large as necessary by increasing length of these elements, compensating for the increased resistance by changing the cross-sections. Once a rough calibration has been established by the initial design as to the number of resistance-determining elements, the initial separation between the terminal members (as established by the depths of the bores 32 and the overall length of the resistance-determining elements), and the cross-section of the elements, it is possible to finally calibrate after assembly, as will become apparent from inspection of Figs. 1 and 6. Specifically, with the shunt 10 connected in an appropriate calibrating circuit, it may be observed that the resistance is too great. In this event it is merely necessary to decrease the effective length of the resistance elements 26 by making the coatings on the confronting end faces 22d, 24d of greater widths to effectively cut down the traversing lengths between the terminal member 22, 24. In the event that the resistance is too low, incremental increases may be effected by providing small holes in the elements 26 such as 38, which effectively decrease the cross-sectional area of the resistance-determining elements 26. Any number of these holes may be provided to arrive at the final calibrated value without adversely effecting the structural strength of the shunt.

From the foregoing, it can be seen that the present invention provides a novel shunt construction and method of fabrication which makes possible more perfect calibration of shunts and assures maintenance of the calibration during field installation. The shunt is capable of withstanding relatively sharp blows and high parting forces without disturbing the initial calibration. The foregoing desirable advantages are arrived at by a technique which is basically simple, thereby facilitating mass production at low unit cost.

While in accordance with the provisions of the statutes, I have illustrated and described the best form of embodiment of my invention now known to me, it will be apparent to those skilled in the art that changes may be made in the form of the article disclosed without departing from the spirit of my invention as set forth in the appended claims and that in some cases certain features of my invention may be used to advantage without a corresponding use of other features.

What I claim is:

1. A direct current shunt constructed to provide a predetermined resistance over a rated current range comprising a pair of spaced apart conductive heads having confronting faces provided with aligned sets of circular bores, a plurality of circular resistance-determining elements extending between said heads and each having end sections force fitted into an aligned set of bores, a continuous metallic coating mechanically and electrically connecting each of said end sections to the wall of the surrounding bore, and a further metallic coating on said confronting faces imparting further mechanical stability to the connection between said resistance-determining elements and said heads, said further metallic coating serving as a means by which the effective length of said resistance-determining elements may be adjusted in arriving at a predetermined resistance value, the separation of said heads and the effective length of said resistance-determining elements being established to provide peripheral surfaces capable of carrying off heat losses over said rated current range, the cross-section of said resistance-determining elements being selected to provide said predetermined resistance at the established head separation.

2. A direct current shunt constructed to provide a predetermined resistance over a rated current range comprising a pair of spaced apart conductive heads having confronting faces provided with aligned sets of circular bores, a plurality of circular resistance-determining elements fabricated of a low temperature coefficient alloy, said resistance-determining elements extending between said heads and each having end sections force fitted into an aligned set of bores, a continuous metallic coating mechanically and electrically connecting each of said end sections to the wall of the surrounding bore, and a further metallic coating on said confronting faces imparting further mechanical stability to the connection between said resistance-determining elements and said heads, said further metallic coating serving as a calibration by which the effective length of said resistance-determining elements may be adjusted to arrive at a predetermined resistance value, the separation of said heads and the effective length of said resistance-determining elements being established to provide peripheral surfaces capable of carrying off heat losses over said rated current range, the cross-section of said resistance-determining elements being selected to provide said predetermined resistance at the established head separation.

References Cited in the file of this patent

UNITED STATES PATENTS

| Number | Name | Date |
|---|---|---|
| 696,757 | Rypinski | Apr. 1, 1902 |
| 768,764 | Leonard | Aug. 30, 1904 |
| 1,570,084 | Russell | Jan. 19, 1926 |
| 1,601,840 | Angus | Oct. 5, 1926 |
| 1,835,582 | Allen | Dec. 8, 1931 |
| 2,003,625 | Boyer | June 4, 1935 |
| 2,224,145 | Dugan et al. | Dec. 10, 1940 |
| 2,503,429 | Ziegler | Apr. 11, 1950 |